United States Patent
Kim et al.

(10) Patent No.: US 10,149,099 B2
(45) Date of Patent: Dec. 4, 2018

(54) METHOD AND USER EQUIPMENT FOR RELAYING PROXIMITY SERVICE-BASED GROUP COMMUNICATION

(71) Applicant: LG Electronics Inc., Seoul (KR)

(72) Inventors: Laeyoung Kim, Seoul (KR); Jinsook Ryu, Seoul (KR); Hyunsook Kim, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 15/107,202

(22) PCT Filed: Jan. 5, 2015

(86) PCT No.: PCT/KR2015/000056
§ 371 (c)(1),
(2) Date: Jun. 22, 2016

(87) PCT Pub. No.: WO2015/102445
PCT Pub. Date: Jul. 9, 2015

(65) Prior Publication Data
US 2018/0132059 A1    May 10, 2018

Related U.S. Application Data

(60) Provisional application No. 61/923,730, filed on Jan. 5, 2014, provisional application No. 62/072,439, filed
(Continued)

(51) Int. Cl.
*H04W 80/04* (2009.01)
*H04W 4/02* (2018.01)
(Continued)

(52) U.S. Cl.
CPC ............. *H04W 4/023* (2013.01); *H04W 4/08* (2013.01); *H04W 40/12* (2013.01);
(Continued)

(58) Field of Classification Search
CPC ....... H04W 4/08; H04W 40/12; H04W 84/12; H04W 72/04
See application file for complete search history.

(56) References Cited

U.S. PATENT DOCUMENTS

2011/0144788 A1 * 6/2011 Wang .................. G06F 17/5018
700/104
2011/0234056 A1 * 9/2011 Jenninger ................. B06B 1/06
310/367
(Continued)

FOREIGN PATENT DOCUMENTS

CN         102811497 A    12/2012
KR      1020080085025       9/2008
(Continued)

OTHER PUBLICATIONS

PCT/KR2015/000056 Date Mar. 30, 2015.

*Primary Examiner* — Andrew Lee
(74) *Attorney, Agent, or Firm* — Dentons US LLP

(57) ABSTRACT

Provided in one disclosure of the present specification is a method for relaying a proximity service-based group communication by user equipment (UE) which can operate as a repeater. The method comprises the steps of: confirming whether downlink media of a plurality of group communications is transmitted from a network node according to a multimedia broadcast/multicast service (MBMS) technique; determining whether all of the downlink media of the plurality of group communications can be received according to the MBMS technique; determining a specific group communication of which the downlink media is to be received according to the MBMS technique, based on priority among the group communications and the number of relayed UEs, when all of the downlink media of the plurality of group communications cannot be received according to the MBMS technique; and receiving, according to the
(Continued)

MBMS technique, the downlink media of the specific group communication which has been determined and relaying same.

12 Claims, 16 Drawing Sheets

Related U.S. Application Data on Oct. 30, 2014, provisional application No. 62/086,200, filed on Dec. 2, 2014.

(51) Int. Cl.
*H04W 4/08* (2009.01)
*H04W 40/12* (2009.01)
*H04W 88/04* (2009.01)
*H04W 72/00* (2009.01)
*H04W 76/40* (2018.01)

(52) U.S. Cl.
CPC .......... *H04W 72/005* (2013.01); *H04W 76/40* (2018.02); *H04W 88/04* (2013.01)

(56) References Cited

U.S. PATENT DOCUMENTS

| | | | |
|---|---|---|---|
| 2011/0244788 A1* | 10/2011 | Ode | H04B 7/022 455/7 |
| 2012/0014286 A1* | 1/2012 | Wang | H04L 27/2602 370/254 |
| 2012/0163286 A1* | 6/2012 | Huschke | H04L 12/1881 370/315 |
| 2013/0163507 A1* | 6/2013 | Hoshino | H04B 7/155 370/315 |
| 2013/0336201 A1* | 12/2013 | Nishio | H04W 16/26 370/315 |
| 2014/0003326 A1* | 1/2014 | Nishio | H04W 16/26 370/315 |
| 2014/0126464 A1* | 5/2014 | Barrett | H04L 1/08 370/315 |
| 2015/0065118 A1* | 3/2015 | Davies | H04W 72/048 455/419 |
| 2015/0099555 A1* | 4/2015 | Krishnaswamy | H04W 4/70 455/509 |
| 2015/0229677 A1* | 8/2015 | Gu | H04L 65/103 709/219 |
| 2016/0246299 A1* | 8/2016 | Berberian | G05D 1/0038 |

FOREIGN PATENT DOCUMENTS

| | | |
|---|---|---|
| KR | 1020090005604 | 1/2009 |
| KR | 1020110016634 | 2/2011 |
| KR | 1020120074255 | 7/2012 |
| WO | 2012077971 | 1/2012 |

\* cited by examiner

US 10,149,099 B2

METHOD AND USER EQUIPMENT FOR RELAYING PROXIMITY SERVICE-BASED GROUP COMMUNICATION

This application is a 35 USC § 371 National Stage entry of International Application No. PCT/KR2015/000056 filed Jan. 5, 2015, and claims priority to U.S. Provisional Application Nos. 61/923,730 filed Jan. 5, 2014; 62/072,439 filed Oct. 30, 2014 and 62/086,200 filed Dec. 2, 2014, all of which are hereby incorporated by reference in their entireties as if fully set forth herein.

BACKGROUND OF THE INVENTION

Field of the Invention

The present invention relates to proximity communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, high-speed data traffic is very drastically increasing in recent years. To deal with such an increase in traffic, technologies are introduced to offload traffic of a UE onto a WLAN (Wi-Fi).

The P-GW 53 and the HSS 54 are connected to an access authentication authorization (AAA) server 56. The P-GW 53 and the AAA server 56 may be connected to an evolved packet data gateway (e-PDG) 57. The ePDG 57 serves as a security node for an untrusted non-3GPP network (for example, a WLAN, Wi-Fi, or the like). The ePDG 57 may be connected to a WLAN access gateway (WAG) 58. The WAG 58 may serve as a P-GW in a Wi-Fi system.

As described with reference to FIG. 1, a terminal (or UE) having IP capability may access an IP service network (for example, an IMS) provided by a service provider (that is, an operator) via various components in an EPC based on not only 3GPP access but also non-3GPP access.

FIG. 1 also illustrates various reference points (for example, S1-U, S1-MME, and the like). In the 3GPP system, a conceptual link connecting two functions of different functional entities of the E-UTRAN and the EPC is defined as a reference point. Table 1 below summarizes the reference points illustrated in FIG. 1. There may be various reference points according to a network structure in addition to the examples in Table 1.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are presented in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 transmits a randomly selected random access preamble to the eNodeB 20. Here, the UE 10 selects one of the 64 candidate random access preambles. Furthermore, the UE selects a subframe corresponding to the PRACH configuration index. The UE 10 transmits the selected random access preamble in the selected subframe.

The eNodeB 20 that has received the random access preamble transmits a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6a is an exemplary diagram showing general communication.

Referring to FIG. 6a, UE#1 10-1 is positioned in the coverage of eNodeB#1 20-1 and UE#2 10-2 is positioned in the coverage of eNodeB#2 20-2. Communication between UE#1 10-1 and UE#2 10-2 may be performed via a core network, for example, the S-GW 52/P-GW 53. A communication path via a core network may be referred to as an infrastructure data path. Further, communication through an infrastructure data path is referred to as infrastructure communication.

FIG. 6b illustrates the concept of proximity communication that is expected to be introduced in a next-generation communication system.

Growing demands from users for social network services (SNSs) cause requests for discovery of physically adjacent UEs and for a special application/service, that is, a proximity-based application/service, leading to a further increase in demands for proximity communication between UEs.

To meet the foregoing demands, as illustrated in FIG. 6b, there are discussed methods for enabling direct communications between UE#1 10-1, UE#2 10-2, and UE#3 10-3 or between UE#4 10-4, UE#5 10-5, and UE#6 10-6 without involvement of a BS (eNodeB) 20. Typically, it is possible to enable direct communication between UE#1 10-1 and UE#4 10-4 with the aid of the BS (eNodeB) 20. Meanwhile, UE#1 10-1 may also serve as a relay for UE#2 10-2 and UE#3 10-3, which are distant from the center of a cell. Likewise, UE#4 10-4 may also serve as a relay for UE#5 (10-5) and UE#6(10-6), which are distant from the center of the cell.

However, no specific technical methods have been suggested for operations of UE#1 10-1 and UE#4 10-4, which are capable of serving as a relay.

SUMMARY OF THE INVENTION

Therefore, one disclosure of the present specification is aimed at suggesting a solution to the aforementioned problem.

To achieve the aforementioned purposes of the present invention, one disclosure of the present specification provides a method for relaying proximity service-based group communication. The method may be performed by a user equipment (UE) that is capable of operating as a relay and comprise: checking whether downlink media of a plurality of group communications is transmitted from a network node in a multimedia broadcast/multicast service (MBMS) mode; determining whether it is possible to receive all the downlink media of all the plurality of group communications in the MBMS mode; determining a specific group communication of which downlink media is to be received in the MBMS mode, based on priorities of the group communications and a number of relayed UEs, when it is impossible to receive all the downlink media of all the plurality of group communications in the MBMS mode; and receiving, in the MBMS mode, the downlink media of the determined specific group communication and relaying the downlink media.

The determining of the specific group communication may include: determining a group communication that has a higher priority and requires a relaying for a greater number of UEs.

The determining of the specific group communication may be performed in consideration of kinds and number of media of each group communication.

The determining of the specific group communication may include: determining specific group communication based on a signal strength when the group communications have the same priority and the same number of relayed UEs.

The determining of the specific group communication may be performed in consideration of one or more among configuration information on the UE, user preference configuration information, network policy information, and capability information on the UE capable of operating as a relay.

The determining of the specific group communication may be performed in consideration of information on a radio frequency that the UE currently camps on and information on a radio frequency that the UE is to camp on for reception in the MBMS mode.

The method may further comprise: transmitting, to a relayed UE, a message indicating that it is impossible to receive, in the MBMS mode, downlink media of other group communications which are not determined to be received in the MBMS mode.

To achieve the aforementioned purposes of the present invention, one disclosure of the present specification also provides a user equipment (UE) that relays proximity service-based group communication. The UE may comprise: a transceiver; and a controller. The controller may be configured to: check whether downlink media of a plurality of group communications is transmitted from a network node in a multimedia broadcast/multicast service (MBMS) mode; determine whether it is possible to receive all the downlink media of all the plurality of group communications in the MBMS mode; determine a specific group communication of which downlink media is to be received in the MBMS mode, based on priorities of the group communications and a number of relayed UEs, when it is impossible to receive all the downlink media of all the plurality of group communications in the MBMS mode; and receive, in the MBMS mode, the downlink media of the determined specific group communication and relay the downlink media through the transceiver.

According to a disclosure of the present specification, the aforementioned problem of the conventional technology is solved.

DESCRIPTION OF EXEMPLARY EMBODIMENTS

Figure 1:
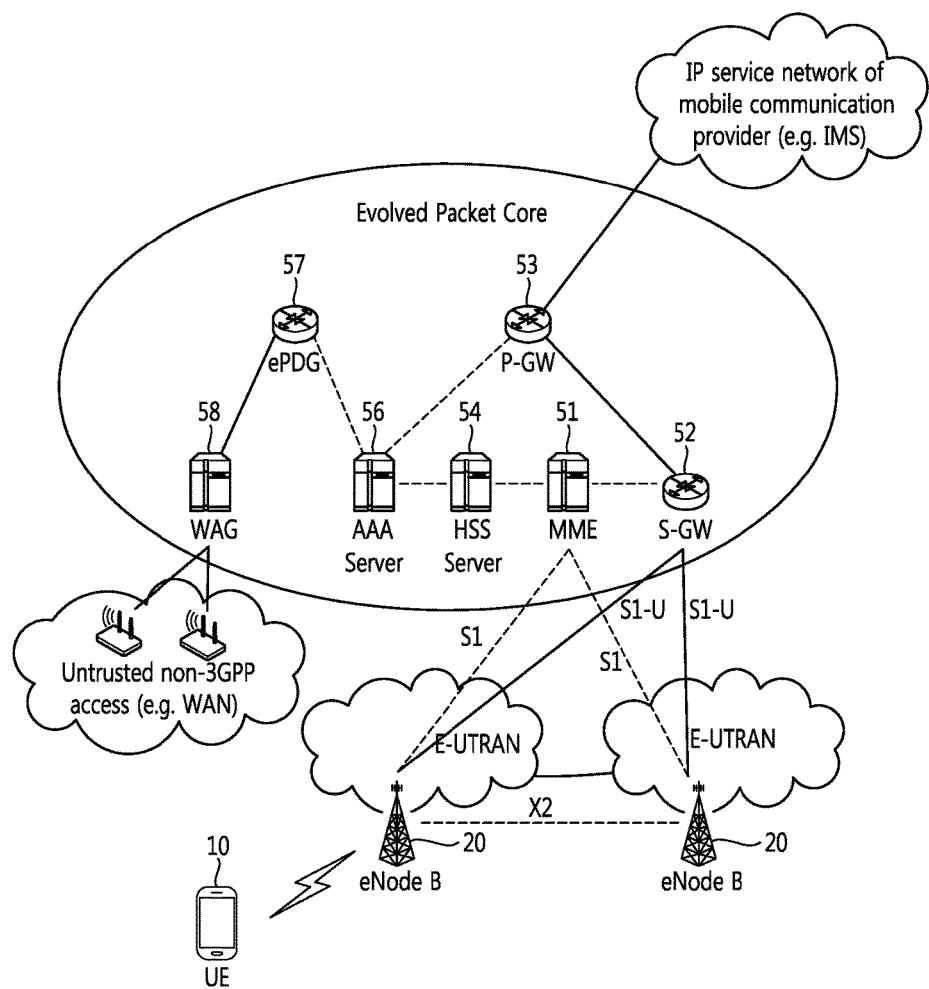
FIG. 1 shows the configuration of an evolved mobile communication network.
Figure 2:
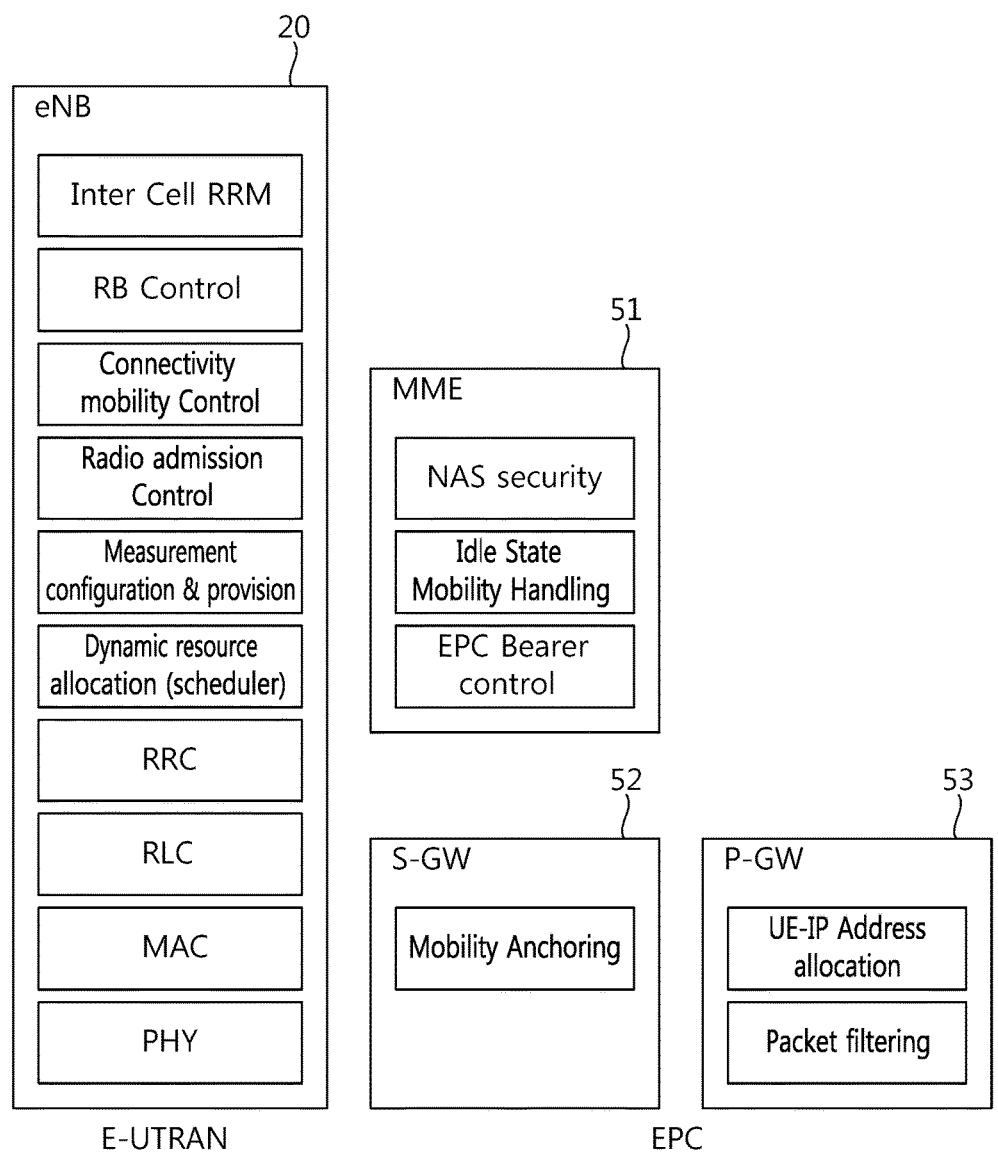
FIG. 2 is an exemplary diagram showing the architecture of a common E-UTRAN and a common EPC.
Figure 3:
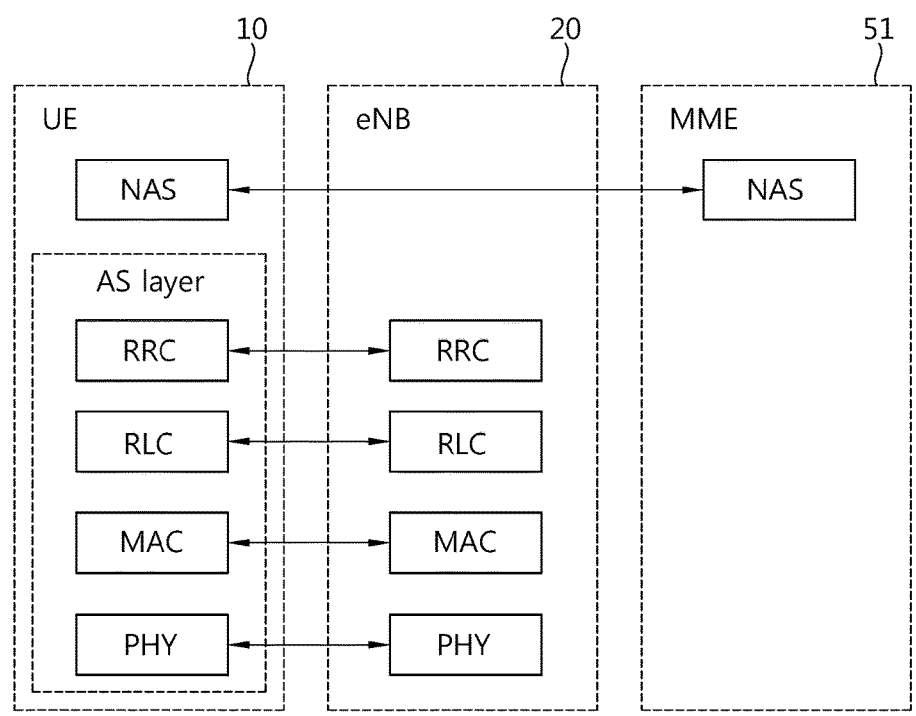
FIG. 3 is an exemplary diagram showing the structure of a radio interface protocol in a control plane between a UE and an eNodeB.
Figure 4:
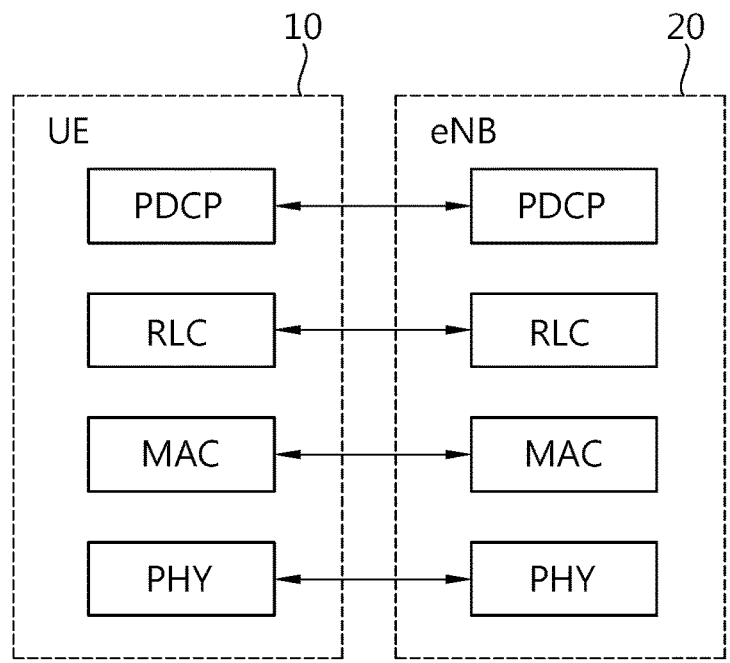
FIG. 4 is another exemplary diagram showing the structure of a radio interface protocol in a control plane between a UE and an eNodeB.
Figure 5:
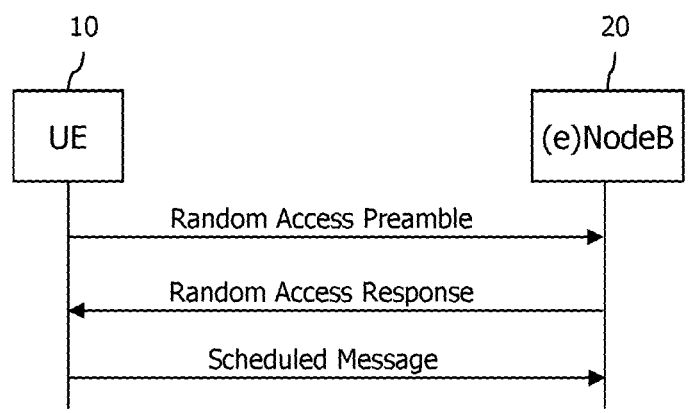
FIG. 5 is a flowchart illustrating a random access process in 3GPP LTE.
Figure 6A:
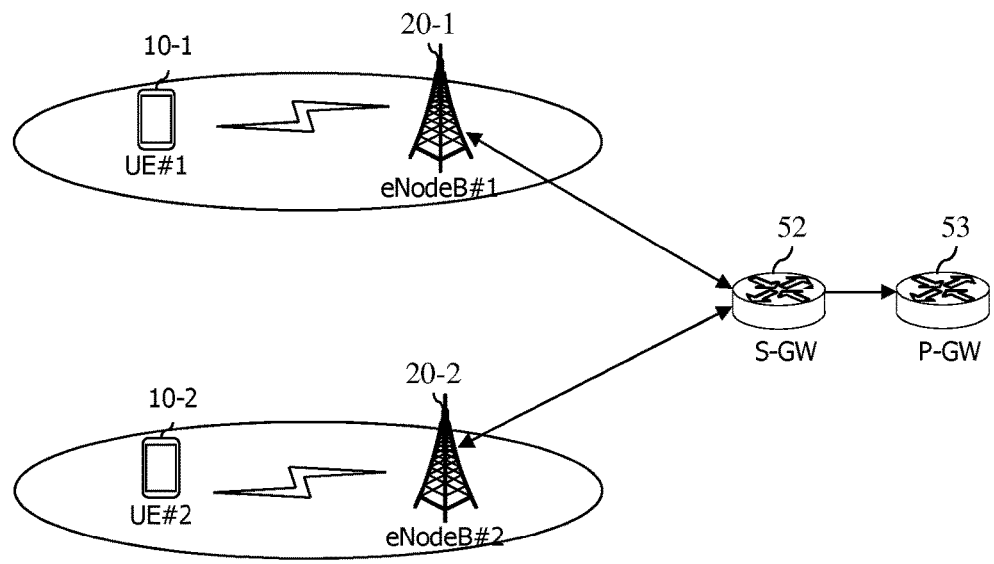
FIG. 6a is an exemplary diagram showing general communication.
Figure 6B:
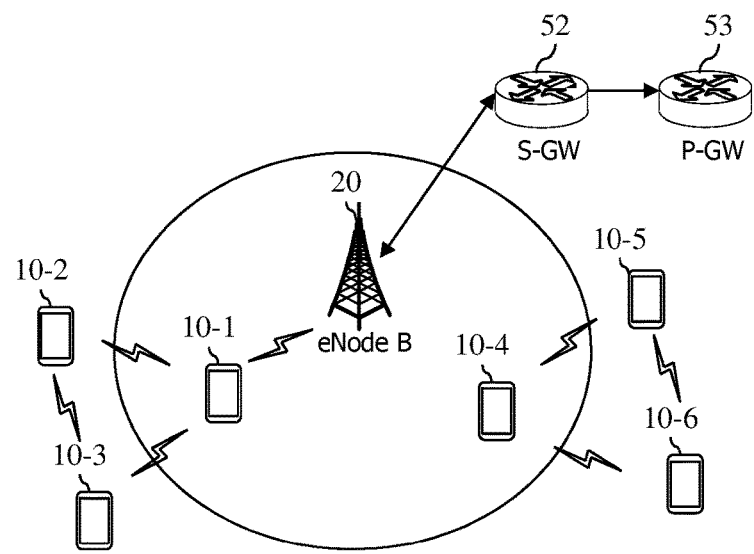
FIG. 6b illustrates the concept of proximity communication that is expected to be introduced in a next-generation communication system.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

NAS (Non-Access-Stratum): upper stratum of a control plane between a UE and an MME. Supports mobility management, session management, IP address management, etc. between a UE and a network.

RAT: an abbreviation of Radio Access Technology. Means GERAN, UTRAN, E-UTRAN, etc.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe relay: may have two types as a UE capable of operating as a relay for ProSe.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

Figure 7A:
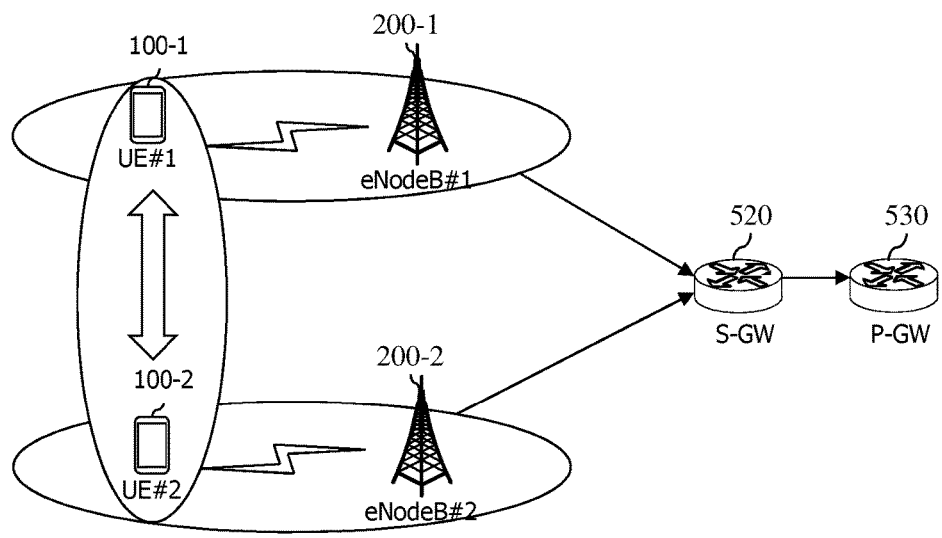
FIG. 7a is an exemplary diagram showing an example of proximity communication.
Figure 7B:
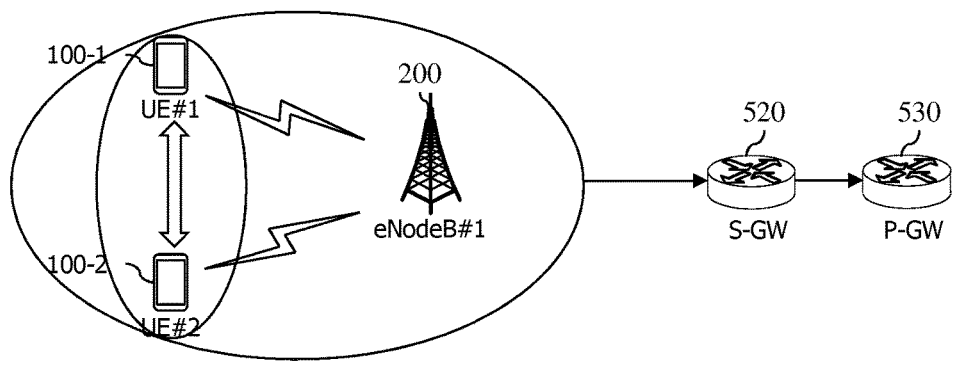
FIG. 7b is an exemplary diagram showing another example of proximity communication.

FIG. 7a is an exemplary diagram showing an example of proximity communication, and FIG. 7b is an exemplary diagram showing another example of proximity communication.

Referring to FIG. 7a, there is illustrated a situation that a UE#1 100-1 and a UE#2 100-2 perform proximity communication through a direct communication path while camping on different eNodeBs, respectively. Referring to FIG. 7b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Meanwhile, an example of a proximity service may be a safety-related service. For example, when a UE user having an emergency is out of the coverage of a base station (BS), the user may transmit a distress signal, which indicates that the user is in an emergency, to another UE through the proximity service. Further, when a UE user is dispatched for a rescue but is out of the coverage of a BS, the user may transmit a distress signal to another UE through the proximity service to inform other rescue workers of the emergency or to make a request for rescue.

Another example of a proximity service may be a social network service (SNS). The SNS causes very frequent data transmissions, thus increasing loads of a BS. Thus, a direct proximity service between UEs without intervention of a BS may reduce loads of a BS.

As still another example of a proximity service, a group communication service may be used. Further, an example of the group communication service may include a Push-To-Talk (PTT) service. Describing group communication with reference to the PTT service, for example, one UE as a talking part may transmit media (for example, a sound or the like) and a plurality of other UEs may receive the media from the talking party UE. Here, a plurality of UEs is not allowed to simultaneously transmit media as talking parties.

When the group communication service is used as an example of a proximity service, data of the service may be transmitted to a UE not only in a unicast mode but also in a multicast mode. As the multicast mode, a multimedia broadcast/multicast service (MBMS) may be used.

Figure 8A:
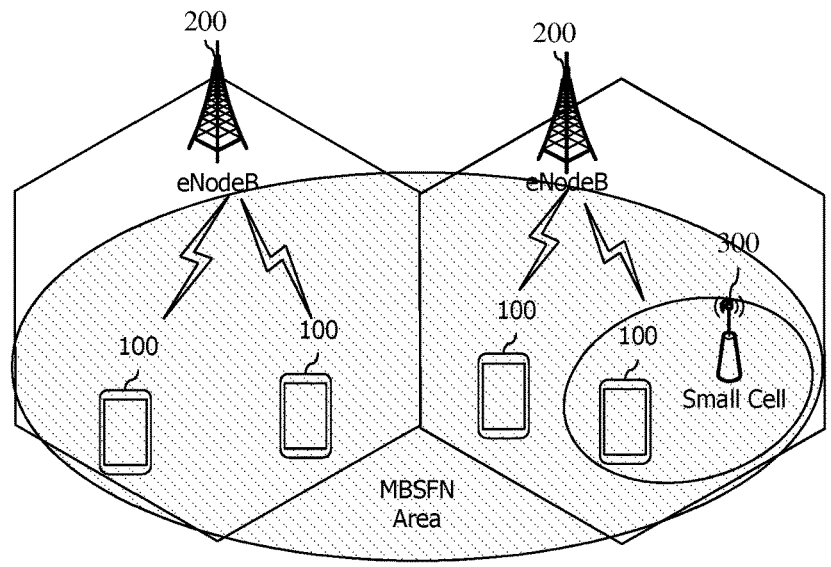
FIG. 8a illustrates an example of a multimedia broadcast/multicast service (MBMS).

FIG. 8*a* illustrates an example of an MBMS.

As illustrated in FIG. 8*a*, an MBMS over a single frequency network (MBSFN) that enables a plurality of eNodeBs 200 to transmit the same data in the same format at the same time is applied in one service area.

The MBMS refers to providing a streaming or background broadcast service or multicast service for a plurality of UEs using a downlink-dedicated MBMS bearer service. Here, the MBMS may be divided into a multi-cell service that provides the same service for a plurality of cells and a single-cell service that provides a service for only one cell.

When a UE receives the multi-cell service, the UE may receive the same multi-cell service transmitted from a plurality of cells in combination in an MBSFN mode.

Figure 8B:
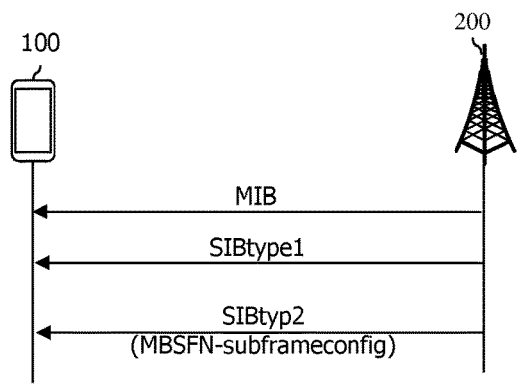
FIG. 8b illustrates an example of a base station (BS) transmitting configuration information on an MBSFN subframe to a UE.
Figure 8C:
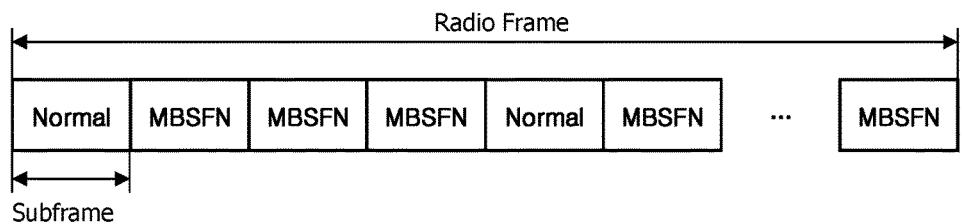
FIG. 8c illustrates an example of an MBSFN subframe.

FIG. 8*b* illustrates an example of a BS transmitting configuration information on an MBSFN subframe to a UE, and FIG. 8*c* illustrates an example of an MBSFN subframe.

Referring to FIG. 8*b*, the BS transmits system information, dividing into a master information block (MIB) and a plurality of system information blocks (SIB). The MIB includes the most important physical layer information on a cell. The SIBs includes different types. A first type of SIB (that is, SIB type 1) includes information used to evaluate whether the UE is allowed to access the cell and scheduling information on another type of SIB. A second type of SIB (SIB type 2) includes information on common and shared channels. A third type of SIB (SIB type 3) includes cell reselection information related mostly to a serving cell. A fourth type of SIB (SIB type 4) includes frequency information on the serving cell and intra-frequency information on a neighbor cell related to cell reselection. A fifth type of SIB (SIB type 5) includes information on a different E-UTRA frequency and inter-frequency information on a neighbor cell related to cell reselection. A sixth type of SIB (SIB type 6) includes information on a UTRA frequency and information on a UTRA neighbor cell related to cell reselection. A seventh type of SIB (SIB type 7) includes information on a GERAN frequency related to cell reselection.

The second type of SIB (SIB type 2) includes information on a subframe configured as an MBSFN subframe. The information on the subframe configured as the MBSFN subframe may be expressed in a bitmap.

As illustrated in FIG. 8*c*, the information on the subframe configured in the MBSFN subframe may represent a subframe configured as an MBSFN subframe among 10 subframes in a radio frame.

Figure 9:
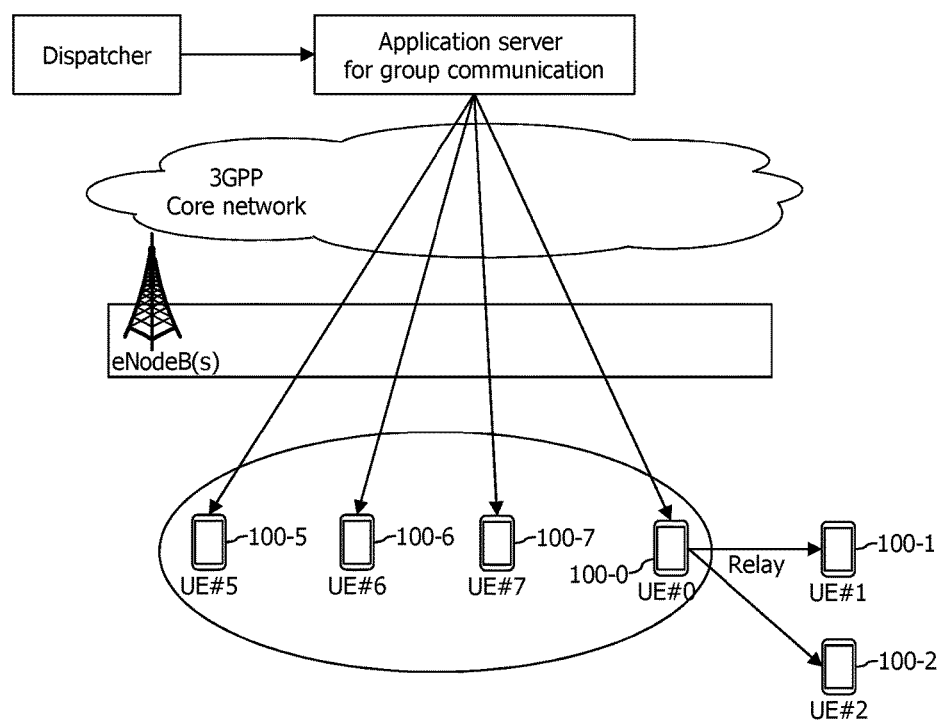
FIG. 9 illustrates an example of using a relay in a group communication service as an example of a proximity service.

FIG. 9 illustrates an example of using a relay in a group communication service as an example of a proximity service.

UE#0 100-0, UE#1 100-1, UE#2 100-2, UE#5 100-5, UE#6 100-6, and UE#7 100-7, illustrated in FIG. 9, join a group communication service provided by an application server and belong to the same group. The group may be managed by a dispatcher that is illustrated.

Assuming that UE#7 100-7 performs discovery in the group, UE#0 100-0, UE#5 100-5, and UE#6 100-3 is in a discovery range of UE#1 100-7 while UE#1 100-1 and UE#2 100-2 is out of the discovery range. UE#0 100-0 may serve as a relay for UE#1 100-1 and UE#2 100-2.

That is, FIG. 9 shows that UE#1 100-1 and UE#2 100-2 are provided with the group communication service through UE#0 100-0, not through a network, which corresponds to a case where UE#1 100-1 and UE#2 100-2 are out of the coverage of an E-UTRAN or are in the coverage of an E-UTRAN which does not support group communication. In this case, UE#1 100-1 and UE#2 100-2 may be provided with the group communication service through a relay by UE#0 100-0. In the present specification, the coverage of an E-UTRAN supporting group communication is referred to as a group communication service range.

In the present specification, UE#1 100-1 and UE#2 100-2, which are provided with a service of connection to a network through UE#0 100-0 operating as a relay, are referred to as remote UEs.

Figure 10:
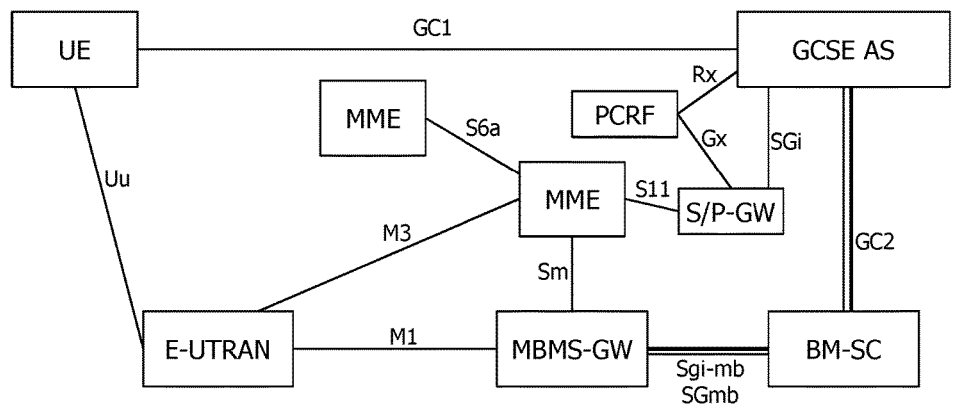
FIG. 10 illustrates architecture for a group communication service as an example of a proximity service.

FIG. 10 illustrates architecture for a group communication service as an example of a proximity service.

Referring to TR 23.768v1.0.0, the architecture for the group communication service is as follows.

A major role of a group communication service enabler application server (GCSE AS) illustrated in FIG. 10 is to determine whether to deliver downlink media (or downlink traffic or downlink data) in the unicast mode or in the multicast mode (that is, MBMS mode) with respect to specific group communication (or specific UE/group member participating in the group communication). If downlink media for certain group communication is transmitted in the MBMS mode, the GCSE AS transmits/provides MBMS related information through a GC1 interface that is illustrated so that UEs participating in the group communication receive MBMS media (or MBMS traffic) corresponding/mapped to the group communication.

The MBMS related information is information on the MBMS media that may include all or part of a user service description (USD) and includes a service ID, a TMGI, multicast address/port information, a radio frequency, or the like. Details about the USD are illustrated in 3GPP TS 26.346.

Figure 11:
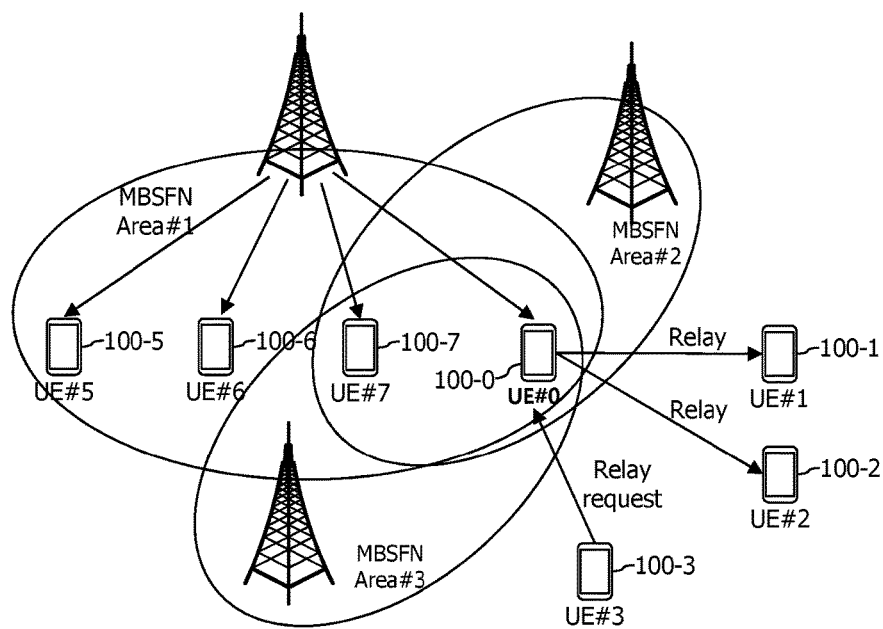
FIG. 11 illustrates a problem occurring when a relay is used in a group communication service.

FIG. 11 illustrates a problem occurring when a relay is used in a group communication service.

Referring to UE-to-network relay-related service requirements defined in Section 7A.2 (Public Safety Specific Requirements for Proximity Services) of the existing 3GPP TS 22.278v12.4.0, a UE operating as a relay (hereinafter, "relay UE") needs to be able to relay data for other UEs using ProSe group communication regardless of group membership.

That is, the relay (for example, UE-to-network relay) needs to serve as a relay regardless of whether the relay is a member of group communication. In other words, the relay (for example, UE-to-network relay) does not participate in the group communication that the relay relays but needs to serve as a relay for another UE that is a member of the group communication. In this case, when downlink media of the group communication is delivered in the MBMS mode, the relay UE needs to acquire MBMS related information to receive MBMS media traffic. The relay UE may acquire the MBMS related information from a GCSE AS or another relayed UE.

In the unicast mode, a BS transmits the downlink media to an individual UE through a PDN connection, while in the MBMS, the BS broadcasts the downlink media to UEs positioned in an MBSFN area. Accordingly, in order that the relay UE relays, to another UE, the downlink data of the group communication of which the relay UE does not have membership, the relay UE needs to adapt to an environment for which the MBMS service is provided when the group communication is transmitted in the MBMS mode. Typically, the relay UE needs to camp on a radio frequency at which the MBMS service is provided.

As illustrated in FIG. 11, suppose that UE#0 100-0 operating as a relay is in a first MBSFN area (MBSFN area#1) to receive, in the MBMS mode, downlink data of first group communication (Group#1) of which the UE#0 100-0 already has membership and relays the downlink data, which is received in the MBMS mode, to UE#1 100-1. Further, suppose that UE#0 100-0 is in a second MBSFN area (MBSFN area#2) to receive, in the MBMS mode, downlink data of second group communication (Group#2) of which the UE#0 100-0 has no membership and relays the downlink data, which is received in the MBMS mode, to UE#2 100-2. Here, suppose that UE#0 100-0 operating as the relay is capable of simultaneously receiving the downlink data since a frequency of the first MBSFN area (MBSFN area#1) and a frequency of the second MBSFN area (MBSFN area#2) are adjacent to each other.

Here, suppose that UE#0 100-0 receives a request for a relay of third group communication (Group#3) from UE#3 100-3 and downlink data of the third group communication (Group#3) is received in the MBMS mode in a third MBSFN area (MBSFN area#3). Here, a frequency of the third MBSFN area (MBSFN area#3) is significantly distant from the frequency of the first MBSFN area (MBSFN area#1) and the frequency of the second MBSFN area (MBSFN area#2).

In this case, UE#0 100-0 operating as the relay needs to change from the frequencies of the first MBSFN area (MBSFN area#1) and the second MBSFN area (MBSFN area#2) to the frequency of the third MBSFN area (MBSFN area#3) in order to relay the downlink data of the third group communication (Group#3) to UE#3 100-3. When UE#0 100-0 leaves the frequencies of the first MBSFN area (MBSFN area#1) and the second MBSFN area (MBSFN area#2), UE#0 100-0 is unable to relay the downlink data of the first group communication (Group#1) in the first MBSFN area (MBSFN area#1) to UE#1 100-1.

However, the existing technology simply indicates that "a UE operating as a relay needs to be able to relay data for a group of other UEs using ProSe group communication regardless of group membership," overlooking a possibility that the foregoing problems occurs.

Therefore, disclosures of the present specification suggest methods for solving the foregoing problem.

Brief Description of Disclosures of the Present Specification

To solve the foregoing problem, disclosures of the present specification suggest a mechanism for efficiently providing group communication using a proximity service in a mobile communication system, such as a 3GPP EPS. The mechanism suggested in the present invention is achieved through combination of one or more operations illustrated below. The mechanism suggested in the present invention is based on a case where a relay UE is not a member of group communication that the relay UE relays.

1. The relay UE (for example, UE#0) recognizing that downlink media of third group communication (Group#3) to relay is in the MBMS mode or the relay UE is to receive the downlink media in the MBMS mode.

Such recognition may be performed based on information acquired from another relayed UE and/or information acquired from a GCSE AS and/or information acquired from a BS (eNodeB). The information may be MBMS related information and/or group communication related information and/or SIB information.

The relay UE (for example, UE#0) performs such recognition at one or more times illustrated below.

a. When the relay UE (for example, UE#0) operates as a relay for new group communication that is not currently relayed by the relay UE.

b. When a transmission mode for downlink media of group communication that is currently relayed by the relay UE (for example, UE#0) is switched from the unicast mode to the MBMS mode.

c. When the relay UE (for example, UE#0) enters an MBSFN area of group communication that is currently relayed by the relay UE (for example, UE#0).

2. The relay UE (for example, UE#0) determining/deciding whether it is possible to receive an MBMS service of the third group communication (that is, Group#3) to relay through new MBMS reception.

Such determination/decision may be based on one or more pieces of information illustrated below. However, various pieces of information necessary for such determination/decision may be used, without being necessarily limited to the following information.

Information on whether downlink media of group communication (for example, Group#1) of which the relay UE (for example, UE#0) has membership is transmitted or is to be transmitted in the MBMS mode; and if in the MBMS mode, MBMS related information (information on a radio frequency for providing an MBMS service and the like).

Information on whether downlink media of another group communication (for example, Group#2) that is relayed by the relay UE (for example, UE#0) is transmitted or is to be transmitted in the MBMS mode; and if in the MBMS mode, MBMS related information (information on a radio frequency for providing an MBMS service and the like).

MBMS related information on group communication (that is, Group#3) to be relayed by the relay UE (for example, UE#0) through new MBMS reception (information on a radio frequency for providing an MBMS service and the like).

Information on a radio frequency that the relay UE (for example, UE#0) currently camps on.

Capability information on the relay UE (for example, UE#0), which includes MBMS related capability information, radio capability information (for example, information on whether carrier aggregation is possible), UE-to-network relay capability information, and the like.

Priority information on the first group communication (for example, Group#1) of which the relay UE (for example, UE#0) has membership.

Priority information on the second group communication (for example, Group#2) that is relayed by the relay UE (for example, UE#0).

Priority information on the third group communication (for example, Group#3) to be relayed by the relay UE (for example, UE#0) through new MBMS reception.

Kinds and number of media of the first group communication (for example, Group#1) of which the relay UE (for example, UE#0) has membership.

Kinds and number of media of the second group communication (for example, Group#2) that is relayed by the relay UE (for example, UE#0).

Kinds and number of media of the third group communication (for example, Group#3) to be relayed by the relay UE (for example, UE#0) through new MBMS reception.

Configuration information on the relay UE (for example, UE#0).

Information on preference of the user of the relay UE (for example, UE#0).

Information on policies provided by a network.

Battery charge information on the relay UE (for example, UE#0).

The number of remote UEs, to which the relay UE (for example, UE#0) relays the first group communication (for example, Group#1) of which the relay UE has membership, +1 (including the relay UE (for example, UE#0)).

The number of remote UEs, to which the relay UE (for example, UE#0) relays the second group communication (for example, Group#2) that is relayed by the relay UE.

The number of remote UEs, to which the relay UE (for example, UE#0) is to relay the third group communication (for example, Group#3) to be relayed by the relay UE through new MBMS reception.

Signal strength at a radio frequency in a case where the first group communication (for example, Group#1) of which the relay UE has membership is in the MBMS mode.

Signal strength at a radio frequency in a case where the second group communication (for example, Group#2) that is relayed by the relay UE (for example, UE#0) is in the MBMS mode.

Signal strength at a radio frequency relating to an MBMS of the third group communication (for example, Group#3) to be relayed by the relay UE (for example, UE#0) through new MBMS reception.

The pieces of information listed above may be acquired variously from one or more among other relayed UEs, the GCSE AS, the BS (eNodeB) that the relay UE (for example, UE#0) camps on, a neighbor BS, a network node defined to provide a ProSe (for example, a ProSe function/server), and the like. Further, part of the listed pieces of information may be information configured in the relay UE (for example, UE#0).

For example, when the relay UE (for example, UE#0) is receiving the downlink media of the first group communication (for example, Group#1), to which the relay UE belongs, at a first frequency (for example, frequency#1) and needs to receive the new downlink media of the third group communication (for example, Group#3) to relay at a third frequency (for example, frequency#3), which is different from the first frequency, the relay UE (for example, UE#0) may determine/decide that it is impossible to receive an MBMS service of Group#3.

For another example, while the relay UE (for example, UE#0) is receiving the downlink media of the third group communication (Group#3) at the third frequency (frequency#3) in the MBMS mode to relay the downlink media to UE#3 100-3, when the downlink media of the first group communication (Group#1) is received at the first frequency (frequency#1) in the MBMS mode, changed from the unicast mode, the relay UE (for example, UE#0) may determine/decide that it is impossible to receive the MBMS service of the third group communication (Group#3) any more, in order to receive the MBMS service of the first group communication (Group#1), of which the relay UE has membership.

For still another example, when the relay UE (for example, UE#0) recognizes that a transmission mode for the downlink media of the third group communication (Group#3) is changed/switched from the unicast mode to the MBMS mode while receiving the downlink media of the second group communication (Group#2) at the second frequency (frequency#2) in the MBMS mode to relay the downlink media to UE#2 100-2 and receiving the downlink media of the third group communication (Group#3) in the unicast mode to relay the downlink media to UE#3 100-3, and the downlink media of the third group communication (Group#3) is received in the MBMS mode at a third frequency (frequency#3), different from the second frequency (frequency#2), the relay UE (for example, UE#0) may determine/decide whether it is possible to receive the MBMS service of the third group communication (Group#3) based on priority of the second group communication (Group#2) and priority of the third group communication (Group#3). For example, when the priority of the third group communication (Group#3) is higher than the priority of the second group communication (Group#2), the relay UE determines that it is impossible to receive the MBMS service of the second group communication (Group#2) any more.

For yet another example, in a case where the number of remote UEs, to which the relay UE (for example, UE#0) relays the downlink media of the second group communication (Group#2) received in the MBMS mode, is five and the number of remote UEs, to which the relay UE (for example, UE#0) relays the downlink media of the third group communication (Group#3) received in the unicast mode, is ten, when the relay UE recognizes that the downlink media of the third group communication (Group#3) is changed/switched from the unicast mode to the MBMS mode, the relay UE may determine/decide that it is possible to receive the MBMS service of the third group communication (Group#3). As a result, it is determined that it is impossible to receive the MBMS service of the second group communication (Group#2) any more.

3. The relay UE (for example, UE#0) receiving downlink media of group communication (that is, Group#2 or Group#3) to relay in the unicast mode, changed from the MBMS mode.

Reception in the unicast mode is determined for one or more reasons illustrated below.

As described above, when recognizing that the downlink media of the third group communication (Group#3) is in the MBMS mode or is to be received in the MBMS mode, the relay UE (for example, UE#0) may determine to receive the downlink media of the third group communication (Group#3) in the changed unicast mode.

As described above, when the relay UE (for example, UE#0) determines/decides that it is impossible to receive the downlink media of the third group communication (that is, Group#3) to newly relay in the MBMS mode, the relay UE may determine to receive the downlink media in the changed unicast mode.

The relay UE (for example, UE#0) may determine to always receive the downlink media of the third group communication (that is, Group#3) to newly relay in the unicast mode.

Meanwhile, to receive the downlink media of the group communication to delay in the changed unicast mode, the relay UE (for example, UE#0) explicitly or implicitly requests the network node to transmit the downlink media in the unicast mode. Here, the network node may be, for example, the GCSE AS, or be an eNodeB, an MBMS related node, a ProSe function, an MME, a server that is in charge of group communication, a Mission Critical Push-To-Talk (MCPTT) AS, and the like, which is applied throughout the present invention.

Meanwhile, the relay UE (for example, UE#0) may transmit a dedicated request message to the network node, for example, the GCSE AS, for a switch to unicast. Alternatively, for a switch to unicast, when transmitting a message for a different purpose to the network node, for example, the GCSE AS, the relay UE (for example, UE#0) may include a request for a switch to unicast in the message. The message for the different purpose may be, for example, a registration message transmitted to register a relayed UE in the GCSE AS.

Alternatively, in order to receive, in the changed unicast mode, the downlink media of the group communication to relay, the relay UE (for example, UE#0) provides a remote UE(s), which receives the relayed group communication, with one or more pieces of information illustrated below.

Information indicating that it is impossible to receive the downlink media of the group communication in the MBMS mode.

Information indicating that the downlink media of the group communication is to be received in the changed unicast mode.

The remote UE receiving the foregoing information may request the network (for example, GCSE AS) to transmit the downlink media of the group communication in the unicast mode.

As described above, when the relay UE (for example, UE#0) requests the GCSE AS to transmit the downlink media of the group communication to relay in the changed unicast mode, the GCSE AS may determine to transmit the downlink media to the relay UE (for example, UE#0) in the unicast mode even though recognizing that the relay UE (for example, UE#0) is not a member of the group communication. Alternatively, when the GCSE AS recognizes that the relay UE (for example, UE#0) is not a member of the group communication, the GCSE AS may transmit the downlink media of the group communication to the relay UE (for example, UE#0) in the unicast mode. Alternatively, the GCSE AS may determine to always transmit the downlink media of the group communication to the relay UE (for example, UE#0) in the unicast mode regardless of whether the relay UE (for example, UE#0) is a member of the group communication.

Alternatively, the GCSE AS may determine/decide whether the relay UE (for example, UE#0) is capable of receiving the downlink media of the group communication to relay in the MBMS mode and accordingly may determine to transmit the downlink media in the unicast mode, which is possible since the GCSE AS already has various pieces of information necessary for such determination/decision and may acquire, if insufficient, necessary information from the relay UE (for example, UE#0), other relayed UEs, and an MBMS related node.

Subsequently, the GCSE AS transmits the downlink media of the group communication to the relay UE (for example, UE#0) in the unicast mode. Then, the relay UE (for example, UE#0) delivers the downlink media, received in the unicast mode, to another UE through direct communication.

4. The relay UE (for example, UE#0) stopping a relay service.

The relay UE (for example, UE#0) stops the relay service for one or more reasons illustrated below.

As described above, when the relay UE recognizes that the downlink media of the third group communication (Group#3) is in the MBMS mode or is to be received in the MBMS mode but it is impossible to receive the downlink media in the MBMS mode, the relay UE may determine to stop a relay service for the third group communication (Group#3).

When the relay UE (for example, UE#0) determines that it is impossible to receive the downlink media of the second group communication (Group#2) or third group communication (Group#3) in the MBMS mode, the relay UE may determine to stop a relay service for corresponding group communication.

When determining to stop a relay service for a specific group, the relay UE (for example, UE#0) may perform one or more operations illustrated below.

Instructing UEs, which are members of the group communication and receive the relay service, that the relay service is stopped.

Instructing UEs, which are members of the group communication and receive the relay service, that the relay service is impossible.

Instructing UEs, which are members of the group communication and receive the relay service, that it is impossible to receive the downlink media in the MBMS mode.

Instructing UEs, which are members of the group communication and receive the relay service, to find or reselect a different relay UE.

Providing UEs, which are members of the group communication and receive the relay service, with information on another available (or selectable) relay UE.

The contents of operations 3 and 4 may be combined. For example, when the relay UE determines that it is impossible to receive the downlink media of the second group communication (Group#2) in the MBMS mode, the relay UE may receive the downlink media in the unicast mode for some UEs belonging to the second group communication (Group#2) and may stop the relay service for the remaining UEs.

There has been suggested a method of receiving downlink media of group communication by changing to the unicast mode when it is impossible to receive the downlink media of the group communication in the MBMS mode in a case where the relay UE (for example, UE#0) is not a member of the group communication to relay. This method is also applicable when the relay UE (for example, UE#0) is a member of the group communication. Also, the foregoing description may be applicable in an extended manner such that when the relay UE (for example, UE#0) determines to receive the downlink media of the third group communication in the MBMS mode so that it is impossible to receive the downlink media of the first group communication in the MBMS mode, the relay UE receives the downlink media of the first group communication in the changed unicast mode.

Although group communication including a UE-to-network relay operation has been illustrated above, the proximity service-based group communication method suggested in the present invention may also be applied in an extended manner to group communication including a UE-to-UE relay operation. Further, the present invention may also be applied in an extended manner when a plurality of UEs simultaneously transmits media. In addition, the present invention is also applicable not only to group communication but also to one-to-one communication and broadcast communication through a relay.

The present invention may be applied to the entire UMTS/EPS mobile communication system including both a 3GPP network (for example, UTRAN/GERAN/E-UTRAN) and a non-3GPP network (for example, WLAN and the like), without be limited to an LTE/EPC network. Further, the present invention may be applied in all other wireless mobile communication system environments to which control of other networks is applied.

Hereinafter, a disclosure of the present specification will be described in detail with reference to drawings.

Figure 12:
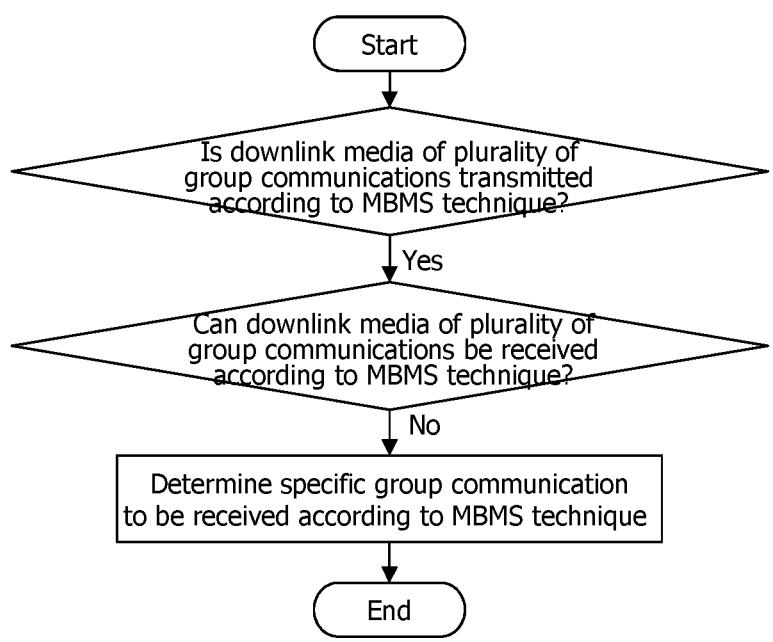
FIG. 12 is a flowchart illustrating an operation according to an embodiment.

FIG. 12 is a flowchart illustrating an operation according to an embodiment.

Referring to FIG. 12, a relay UE (for example, UE#0) verifies whether downlink media of a plurality of group communications is transmitted from a network node in the MBMS mode.

Subsequently, the relay UE (for example, UE#0) determines whether it is possible to receive all of the downlink media of the plurality of group communications in the MBMS mode.

When it is impossible to receive all of the downlink media of the plurality of group communications in the MBMS mode, the relay UE (for example, UE#0) determines a specific group communication of which downlink media is to be received in the MBMS mode based on priorities of the group communications and the number of relayed UEs. Then, the relay UE (for example, UE#0) may receive the downlink media of the determined specific group communication in the MBMS mode to relay the downlink media.

Figure 13:
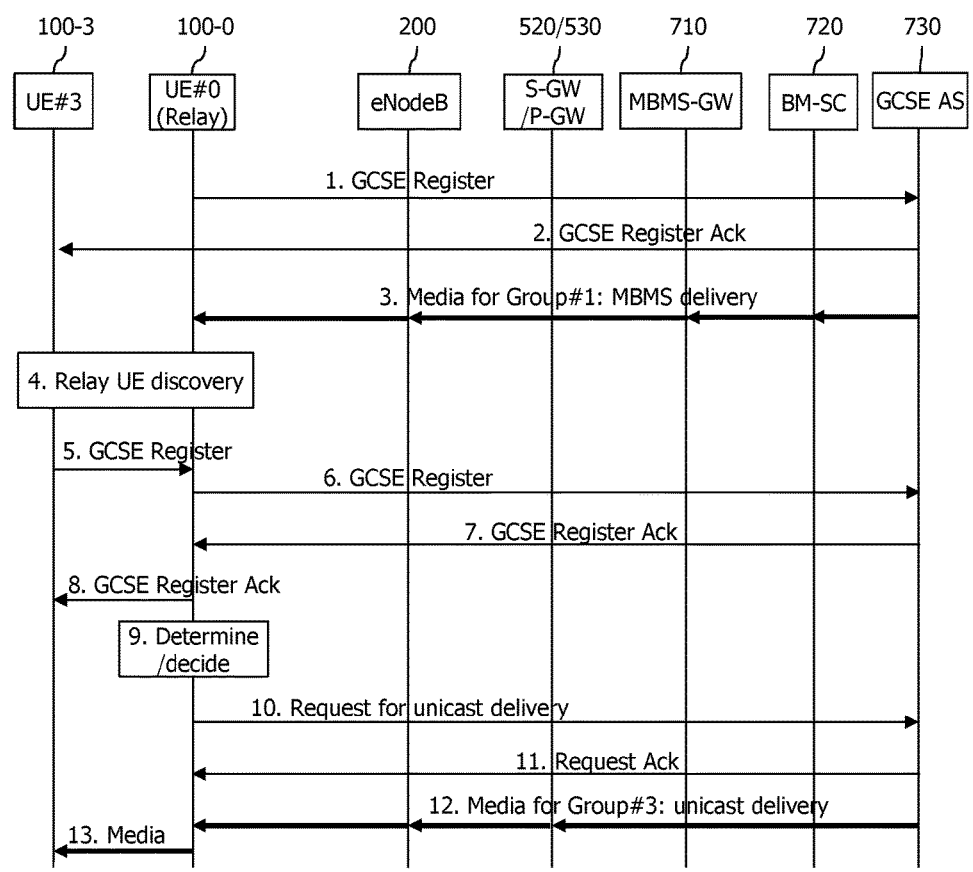
FIG. 13 is a flowchart illustrating an example according to an embodiment.

FIG. 13 is a flowchart illustrating an example according to an embodiment.

Referring to FIG. 13 along with FIG. 11, a situation is illustrated where UE#0 100-0 is a member of a first group communication (Group#1), and UE#3 100-3 is a member of a third group communication (Group#3) but is unable to receive downlink media of the third group communication (Group#3) through a network. Therefore, FIG. 13 illustrates that UE#3 100-3 receives the downlink media of the third group communication (Group#3) through a relay by UE#0 100-0 that is a UE-to-network relay.

1) UE#0 100-0 transmits, to a GCSE AS 730, a message for requesting joining/registration, that is, a GCSE Register message, to participate in group communication with respect to the first group communication (Group#1).

2) The GCSE AS 730 transmits, to UE#0 100-0, a response message to the GCSE Register message received from UE#0 100-0, that is, a GCSE Register Ack message. When downlink media of the first group communication (Group#1) is transmitted in the MBMS mode, the response message may include MBMS related information.

3) The downlink media of the first group communication (Group#1) is transmitted in the MBMS mode.

4) UE#3 100-3 recognizes or discovers the UE-to-network relay to participate in group communication with respect to the third group communication (Group#3). As a result, UE#3 100-3 determines UE#0 100-0 capable of operating as a relay for the third group communication (Group#3). Here, the operation of discovering the UE capable of operating as the relay may refer to a discovery operation performed via an exchange of messages or merely an operation of a relayed UE recognizing/discovering a relay UE.

5) UE#3 100-3 transmits, to UE#0 100-0, a message for requesting joining/registration, that is, a GCSE Register message, to participate in group communication with respect to the third group communication (Group#3) so as to transmit the GCSE Register message to the GCSE AS 730.

6) UE#0 100-0 transmits the GCSE Register message, received from UE#3 100-3, to the GCSE AS 730.

7) The GCSE AS 730 transmits a response message to the GCSE Register message received from UE#3 100-3, that is, a GCSE Register Ack message, to UE#0 100-0 so as to transmit the response message to UE#3 100-3. When the downlink media of the third group communication (Group#3) is transmitted in the MBMS mode, the response message may include MBMS related information.

8) UE#0 100-0 transmits the GCSE Register Ack message, received from the GCSE AS 730, to UE#3 100-3.

9) UE#0 100-0 recognizes that the downlink media of the third group communication (Group#3) to newly relay is transmitted in the MBMS mode (described in detail with reference to the aforementioned operation 1). Accordingly, UE#0 100-0 determines/decides whether it is possible to receive an MBMS service of the third group communication (Group#3) (described in detail with reference to the aforementioned operation 2).

10) If UE#0 100-0 determines/decides that it is impossible to receive the MBMS service of the third group communication (Group#3), UE#0 100-0 transmits, to the GCSE AS 730, a message requesting the GCSE AS 730 to transmit the downlink media of the third group communication (Group#3) in a changed mode which is the unicast mode, that is, a message of a request for unicast delivery.

11) The GCSE AS 730, receiving the request message, transmits a response message, that is, a Request Ack message, to UE#0 100-0.

12) The GCSE AS 730 transmits the downlink media of the third group communication (Group#3) to UE#0 100-0 in the unicast mode.

13) UE#0 100-0, receiving the downlink media of the third group communication (Group#3) from the network, relays the downlink media to UE#3 100-3 through proximity communication (ProSe communication).

Figure 14:
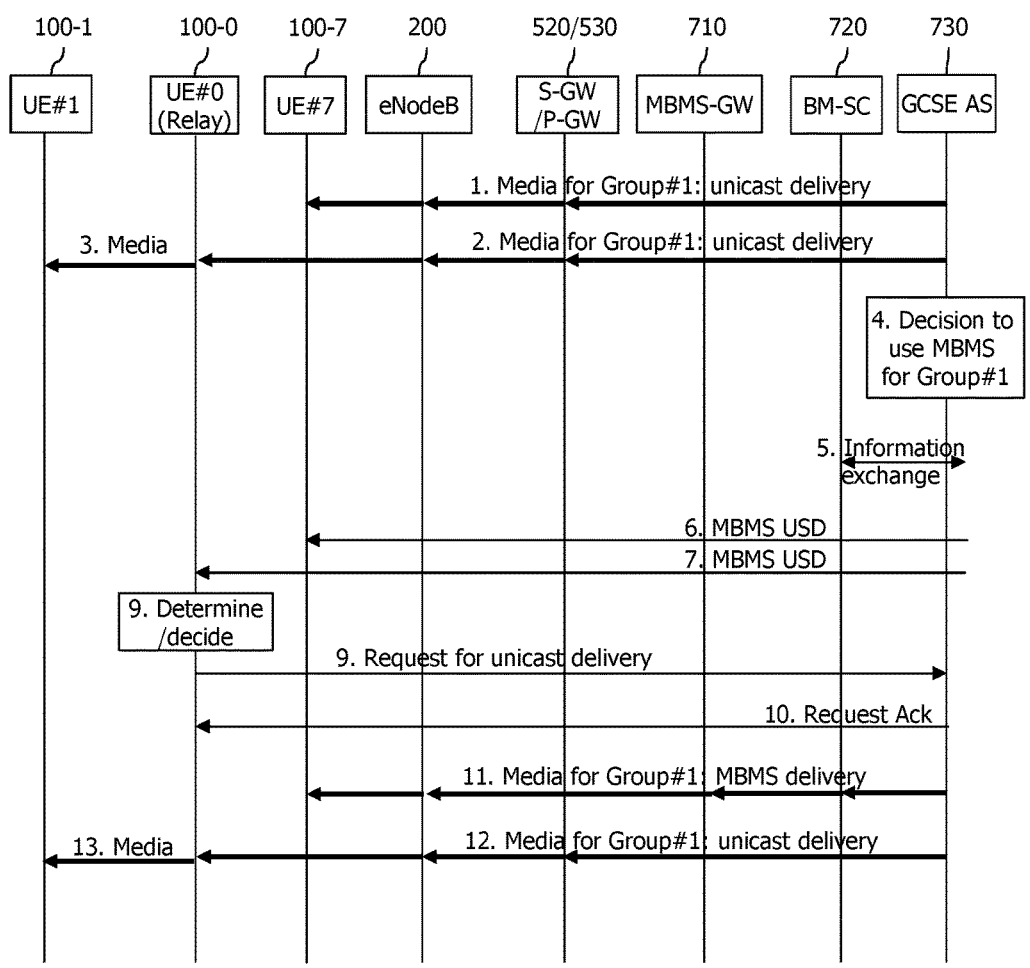
FIG. 14 is a flowchart illustrating another example according to an embodiment.

FIG. 14 is a flowchart illustrating another example according to an embodiment.

Referring to FIG. 14 along with FIG. 11, UE#1 100-1 is unable to receive downlink media of first group communication (Group#1) through a network and thus receives the downlink media of the first group communication (Group#1) through a relay by UE#0 100-0 capable of operating as a UE-to-network relay. Further, UE#7 100-7 is a member of the first group communication (Group#1) and receives the downlink media of the first group communication (Group#1) through the network. Here, unlike FIG. 11, FIG. 14 illustrates a case where the downlink media of the first group communication (Group#1) is received in the MBMS mode, switched from the unicast mode. Further, it is assumed that UE#0 100-0 is not a member of the first group communication (Group#1).

1) A GCSE AS 730 transmits the downlink media to UE#7 100-7 in the unicast mode.

2) The GCSE AS 730 transmits the downlink media to UE#0 100-0 in the unicast mode.

3) UE#0 100-0, which receives the downlink media of the first group communication (Group#1) from the network, relays the downlink media to UE#1 100-1 through proximity communication (ProSe communication).

4) The GCSE AS 730 determines to change the unicast mode to the MBMS mode for the downlink media of the first group communication (Group#1).

5) The GCSE AS 730 acquires related information on MBMS delivery from a BM-SC.

6) The GCSE AS 730 transmits MBMS related information to UE#7 100-7.

7) The GCSE AS 730 transmits the MBMS related information to UE#0 100-0. Alternatively, the GCSE AS 730 may transmit the MBMS related information to UE#7 100-7 and may instruct UE#0 100-0 to acquire the MBMS related information from UE#1 100-1.

8) UE#0 100-0 recognizes that the downlink media of the first group communication (Group#1) to relay is received in the MBMS mode (described in detail with reference to the aforementioned operation 1). Accordingly, UE#0 100-0 determines/decides whether it is possible to receive the downlink media of the first group communication (Group#1) in the MBMS mode (described in detail with reference to the aforementioned operation 2).

9) If UE#0 100-0 determines/decides that it is impossible to receive the downlink media in the MBMS mode, UE#0 100-0 transmits, to the GCSE AS 730, a message requesting the GCSE AS 730 to transmit the downlink media of the first group communication (Group#1) in the unicast mode, that is, a message of a request for unicast delivery.

10) The GCSE AS 730 receiving the request message transmits a response message, that is, a Request Ack message, to UE#0 100-0.

11) The GCSE AS 730 transmits the downlink media to UE#7 100-7 in the MBMS mode.

12) However, the GCSE AS 730 transmits the downlink media to UE#0 100-0 in the unicast mode.

13) UE#0 100-0, receiving the downlink media of the first group communication (Group#1) from the network, relays the downlink media to UE#1 100-1 through proximity communication (ProSe communication).

Figure 15:
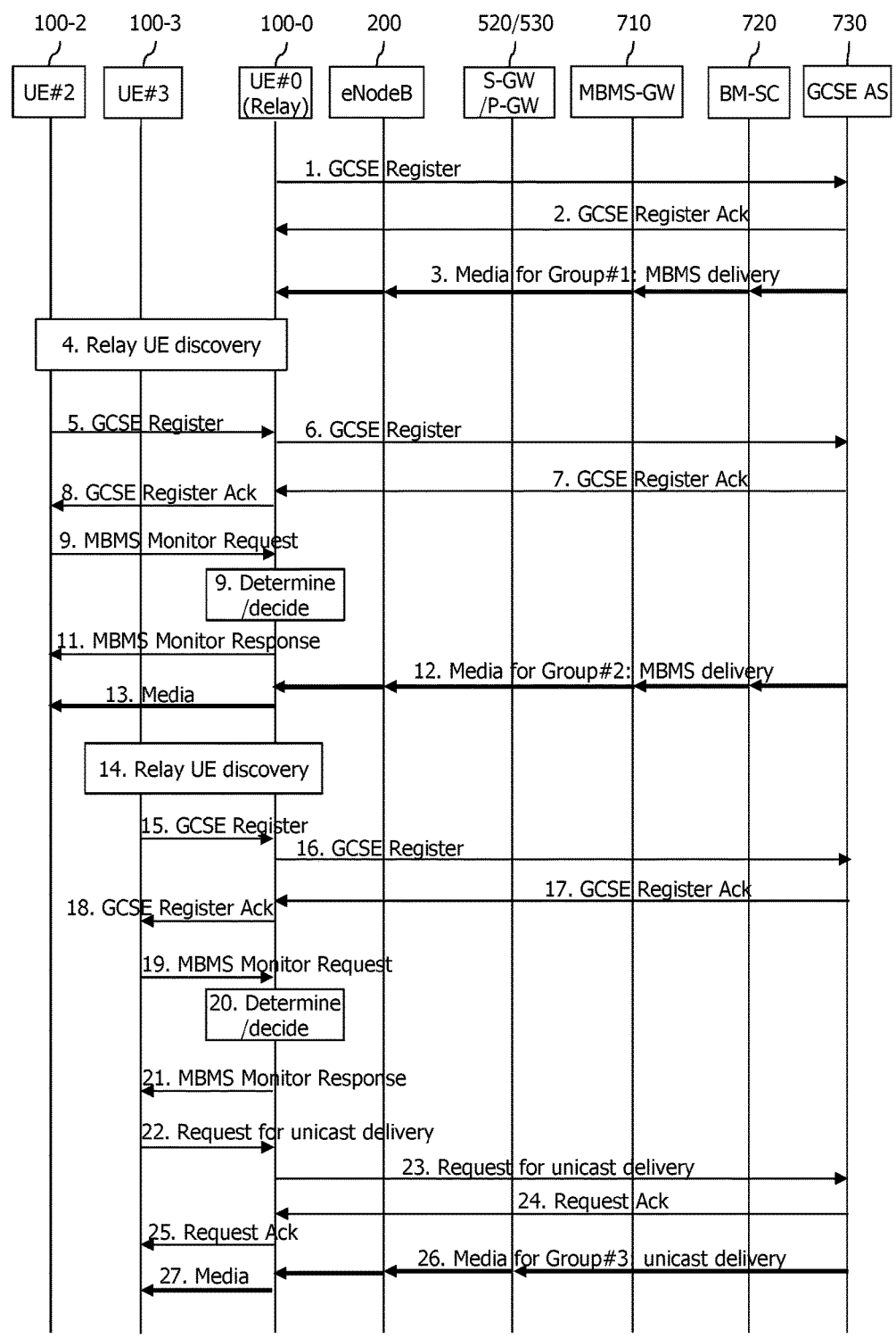
FIG. 15 is a flowchart illustrating still another example according to an embodiment.

FIG. 15 is a flowchart illustrating still another example according to an embodiment.

Referring to FIG. 15 along with FIG. 11, UE#0 100-0 is a member of first group communication (Group#1) and receives downlink media of the first group communication (Group#1) in the MBMS mode to relay the downlink media to UE#1 100-1. UE#2 100-2 is a member of second group communication (Group#2) but is unable to receive downlink media of the second group communication (Group#2) through a network and thus is to receive the downlink media through UE#0 100-0 capable of operating as a UE-to-network relay. Likewise, UE#3 100-3 is a member of third group communication (first group communication (Group#1)) but is unable to receive downlink media of the third group communication (Group#3) through the network and thus is to receive the downlink media through UE#0 100-0 capable of operating as the UE-to-network relay.

1) UE#0 100-0 transmits, to a GCSE AS 730, a message for joining/registration, that is, a GCSE Register message, to participate in the first group communication (Group#1).

2) The GCSE AS 730 transmits, to UE#0 100-0, a response message to the GCSE Register message received from UE#0 100-0, that is, a GCSE Register Ack message. The response message may include MBMS related information on the first group communication (Group#1). Alternatively, the MBMS related information may be transmitted to UE#0 100-0 through a separate message (not shown).

3) The downlink media of the first group communication (Group#1) is transmitted to UE#0 100-0 in the MBMS mode.

4) UE#2 100-2 recognizes or discovers the UE-to-network relay to participate in group communication with respect to the second group communication (Group#2). As a result, UE#0 100-0 is selected as the UE-to-network relay. Here, the operation of discovering the UE-to-network relay may include an operation of mutually transmitting and receiving messages or be merely an operation of UE#2 100-2 recognizing/discovering the UE-to-network relay.

5-6) UE#2 100-2 transmits, to the GCSE AS 730 through UE#0 100-0, a message for joining/registration, that is, a GCSE Register message, to participate in the second group communication (Group#2). Here, UE#0 100-0 may route/transmit the GCSE Register message to the GCSE AS 730 without deciphering the message or may route/transmit the GCSE Register message to the GCSE AS 730 via deciphering the message and adding necessary information (for example, ID information on UE#0 100-0 or the like) to the GCSE Register message.

7-8) The GCSE AS 730 transmits, to UE#2 100-2 through UE#0 100-0, a response message to the GCSE Register message received from UE#2 100-2, that is, a GCSE Register Ack message. The response message may include MBMS related information on the second group communication (Group#2). Alternatively, the MBMS related information may be transmitted to UE#2 100-2 through a separate message (not shown). Here, UE#0 100-0 may merely deliver the message, transmitted from the GCSE AS 730 to UE#2 100-2, without deciphering the message or may route/transmit the message to the UE#2 100-2 via deciphering the message and adding necessary information (for example, ID information on UE#0 100-0 or the like) to the message.

9) UE#2 100-2 transmits, to UE#0 100-0, a message requesting MBMS reception for the second group communication (Group#2). The message includes information necessary for MBMS reception (for example, Temporary Mobile Group Identity (TMGI) or the like).

10) UE#0 100-0 recognizes that the downlink media of the second group communication (Group#2) to relay is received in the MBMS mode (described in detail with reference to the aforementioned operation 1). Accordingly, UE#0 100-0 determines/decides whether it is possible to receive the downlink media of the second group communication (Group#2) in the MBMS mode (described in detail with reference to the aforementioned operation 2).

11) When determining/deciding that it is possible to receive the downlink media in the MBMS, UE#0 100-0 notifies UE#2 100-2 that it is possible to receive the downlink media of the second group communication (Group#2) in the MBMS mode when transmitting a response to the request for MBMS reception. Here, a response message itself may indicate acceptance or acknowledgement or information included in the response may indicate acceptance or acknowledgement.

12-13) The downlink media of the second group communication (Group#1) is transmitted to UE#0 100-0 in the MBMS mode. UE#0 100-0 receiving the downlink media relays the downlink media to UE#2 100-2 through proximity communication (ProSe communication).

14) UE#3 100-3 recognizes or discovers the UE-to-network relay to participate in group communication with respect to the third group communication (Group#3). As a result, UE#0 100-0 is selected as the UE-to-network relay. A detailed description has been made above in 4).

15-16) UE#3 100-3, to the GCSE AS 730 through UE#0 100-0, a message for joining/registration, that is, a GCSE Register message, to participate in the third group communication (Group#3). A detailed description has been made above in 5) and 6).

17-18) The GCSE AS 730 transmits, to UE#3 100-3 through UE#0 100-0, a response message to the GCSE Register message received from UE#0 100-0, that is, a GCSE Register Ack message. A detailed description has been made above in 7) and 8).

19) UE#3 100-3 transmits, to UE#0 100-0, a message for requesting UE#0 100-0 to receive and relay the downlink media of the third group communication (Group#3) in the MBMS mode. The message includes information necessary for MBMS reception (for example, Temporary Mobile Group Identity (TMGI) or the like).

20) UE#0 100-0 recognizes that the downlink media of the third group communication (Group#3) to relay is received in the MBMS mode (described in detail with reference to the aforementioned operation 1). Accordingly, UE#0 100-0 determines/decides whether it is possible to receive the downlink media of the third group communication (Group#3) in the MBMS mode (described in detail with reference to the aforementioned operation 2).

21) When determining/deciding that it is impossible to receive the downlink media of the third group communication (Group#3) in the MBMS mode, UE#0 100-0 notifies UE#3 100-3 that it is impossible to receive the downlink media of the third group communication (Group#3) in the MBMS mode when transmitting a response to UE#3 100-3 (described in detail with reference to the aforementioned operation 3). Here, a response message itself may indicate rejection or non-acknowledgement or information included in the response may indicate rejection or non-acknowledgement.

22-23) UE#3 100-3 transmits, to the GCSE AS 730 through UE#0 100-0, a message for requesting the GCSE AS 730 to transmit the downlink media of the third group communication (Group#3) in the unicast message, that is, a message of a request for unicast delivery. Here, UE#0 100-0 may route/transmit the message of the request for unicast delivery to the GCSE AS 730 without deciphering the message or may route/transmit the message of the request for unicast delivery to the GCSE AS 730 via deciphering the message and adding necessary information (for example, ID information on UE#0 100-0 or the like) to the message.

24-25) The GCSE AS 730, receiving the request message, transmits a response message, that is, a Request Ack message, to UE#3 100-3 through UE#0 100-0. UE#0 100-0 may route/transmit the message, transmitted from the GCSE AS 730 to UE#3 100-3, to UE#3 100-3 without deciphering the message or may route/transmit the message to the UE#3 100-3 via deciphering the message and adding necessary information (for example, ID information on UE#0 100-0 or the like) to the message.

26) The GCSE AS 730 transmits, to UE#0 100-0, the downlink media of the third group communication (Group#3) in the unicast mode.

27) UE#0 100-0, receiving the downlink media of the third group communication (Group#3) from the network in the unicast mode, relays the downlink media to UE#3 100-3 through proximity communication (ProSe communication).

Meanwhile, UE#0 100-0 may receive the downlink media of the second group communication (Group#2) on an MBSFN subframe illustrated in FIG. 8c in the MBMS mode and may receive the downlink media of the third group communication (Group#3) on a normal subframe illustrated in FIG. 8c in the unicast mode.

The aforementioned processes illustrated in the drawings may not always necessarily be performed and only some steps may be performed as necessary.

The foregoing descriptions may be implemented in hardware, which is described with reference to FIG. 16.

Figure 16:
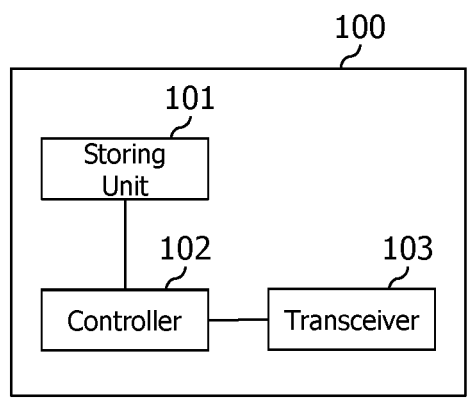
FIG. 16 is a block diagram illustrating a configuration of a UE 100 according to a disclosure of the present specification.

FIG. 16 is a block diagram illustrating a configuration of a UE 100 according to a disclosure of the present specification.

As illustrated in FIG. 16, the UE 100 includes a storage means 101, a controller 102, and a transceiver 103.

The storage means 101 stores the foregoing methods.

The controller 102 controls the storage means 101 and the transceiver 103. Specifically, the controller 102 implements the foregoing methods stored in the storage means 101. The controller 102 transmits the foregoing signals through the transceiver 103.

Although exemplary embodiments of the present invention have been illustrated above, the scope of the present invention is not limited by these specific embodiments. Therefore, the present invention may be changed, modified, or adapted variously without departing from the idea of the present invention and the appended claims.

What is claimed is:

1. A method for relaying proximity service-based group communication, the method performed by a user equipment (UE) that is capable of operating as a relay and the method comprising:

checking whether downlink media of a plurality of group communications is transmitted from a network node in a multimedia broadcast/multicast service (MBMS) mode;

determining whether the UE is allowed to receive all the downlink media of the plurality of group communications in the MBMS mode;

determining a specific group communication for which downlink media is to be received in the MBMS mode, based on priorities of the group communications and a number of relayed UEs, when the UE is not allowed to receive all the downlink media of the plurality of group communications in the MBMS mode; and receiving, in the MBMS mode, the downlink media of the determined specific group communication and relaying the downlink media, wherein the determined specific group communication has a higher priority and a predetermined number of relayed UEs.

2. The method of claim 1, wherein Ma determining the specific group communication is performed based on a number and type of downlink media in each group communication.

3. The method of claim 1, wherein determining the specific group communication includes:

determining specific group communication based on a signal strength, when the group communications have the same priority and the same number of relayed UEs.

4. The method of claim 1, wherein determining the specific group communication is performed based on one or more of UE configuration information, user preference configuration information, network policy information, and capability information of the UE operating as a relay.

5. The method of claim 1, wherein determining the specific group communication is performed based on a radio frequency that the UE is currently camped on and on a radio frequency that the UE camps on for reception in the MBMS mode.

6. The method of claim 1, further comprising:

transmitting, to a relayed UE, a message indicating that the UE is not allowed to receive downlink media of other group communications in the MBMS mode.

7. A user equipment (UE) that relays proximity service-based group communication, the UE comprising:

a transceiver; and a controller, operably coupled to the transceiver, that:

checks whether downlink media of a plurality of group communications is transmitted from a network node in a multimedia broadcast/multicast service (MBMS) mode, determines whether the UE is allowed to receive all the downlink media of the plurality of group communications in the MBMS mode, determines a specific group communication for which downlink media in the MBMS mode, based on priorities of the group communications and a number of relayed UEs, when the UE is not allowed to receive all the downlink media of the plurality of group communications in the MBMS mode, and controls the transceiver to receive, in the MBMS mode, the downlink media of the determined specific group communication and to relay the downlink media, wherein the determined specific group communication has a higher priority and a predetermined number of relayed UEs.

8. The UE of claim 7, wherein the controller further determines the specific group communication based on a number and type of downlink media in each group communication.

9. The UE of claim 7, wherein the controller further determines a specific group communication based on signal strength when the group communications have the same priority and the same number of relayed UEs.

10. The UE of claim 7, wherein the controller further determines the specific group communication based on one or more of UE configuration information, user preference configuration information, network policy information, and capability information of the UE operating as a relay.

11. The UE of claim 7, wherein the controller further determines the specific group communication based on a radio frequency that the UE is currently camped on and on a radio frequency that the UE camps on for reception in the MBMS mode.

12. The UE of claim 7, wherein the controller further controls the transceiver to transmit, to a relayed UE, a message indicating that the UE not allowed to receive downlink media of other group communications in the MBMS mode.

* * * * *